US011302074B2

(12) United States Patent
Dawson

(10) Patent No.: US 11,302,074 B2
(45) Date of Patent: Apr. 12, 2022

(54) MOBILE DEVICE 3-DIMENSIONAL MODELING

(71) Applicant: Sony Corporation, Tokyo (JP)

(72) Inventor: Thomas Dawson, Escondido, CA (US)

(73) Assignee: Sony Group Corporation, Tokyo (JP)

( * ) Notice: Subject to any disclaimer, the term of this patent is extended or adjusted under 35 U.S.C. 154(b) by 0 days.

(21) Appl. No.: 16/779,480

(22) Filed: Jan. 31, 2020

(65) Prior Publication Data

US 2021/0241524 A1 Aug. 5, 2021

(51) Int. Cl.
*G06T 17/20* (2006.01)
*G06T 19/00* (2011.01)

(52) U.S. Cl.
CPC ............ *G06T 17/20* (2013.01); *G06T 19/006* (2013.01); *G06T 2200/24* (2013.01); *G06T 2219/024* (2013.01)

(58) Field of Classification Search
CPC ... G06T 17/20; G06T 19/006; G06T 2200/24; G06T 2219/024
See application file for complete search history.

(56) References Cited

U.S. PATENT DOCUMENTS

| 9,972,137 | B2 | 5/2018 | Petrovskaya et al. | |
| 2008/0181486 | A1* | 7/2008 | Spooner | G06T 7/55 |
| | | | | 382/154 |
| 2014/0267234 | A1* | 9/2014 | Hook | G06T 19/006 |
| | | | | 345/419 |
| 2016/0147408 | A1* | 5/2016 | Bevis | G02B 27/017 |
| | | | | 715/850 |
| 2017/0286567 | A1 | 10/2017 | Hana | |
| 2018/0053347 | A1* | 2/2018 | Fathi | G06T 17/05 |
| 2020/0218690 | A1* | 7/2020 | Huston | G06T 19/20 |
| 2020/0294308 | A1* | 9/2020 | Hasegawa | G06T 7/001 |
| 2020/0357177 | A1* | 11/2020 | Park | G06T 17/20 |

OTHER PUBLICATIONS

Sharanya M et al. 3D Drawing with Augmented Reality; https://www.irjet.net/archives/V6/i6/IRJET-V6I6530.pdf; vol. 06 Issue: 06 | Jun. 2019—4 pages.

* cited by examiner

*Primary Examiner* — William A Beutel
(74) *Attorney, Agent, or Firm* — Trellis IP Law Group, PC

(57) ABSTRACT

Implementations generally relate to 3D modeling. In some implementations, a method includes displaying a live video of a scene on a device with a user interface overlay on top of the scene, wherein the user interface overlay includes one or more objects and includes one or more selectable controls. The method further includes receiving a selection of one or more new virtual points on a target object, wherein the target object is one object of the one or more objects in an image. The method further includes generating 3D polygonal data, wherein the 3D polygonal data is saved as a 3-dimensional (3D) model.

14 Claims, 12 Drawing Sheets

400

MOBILE DEVICE 3-DIMENSIONAL MODELING

BACKGROUND 3-dimensional (3D) modeling is the process of developing a mathematical representation of any surface of an object in three dimensions. 3D modeling is typically used in 3D computer graphics and involves various hardware devices to collect 3D modeling data. Such hardware devices may include camera rigs, laser scanners, articulated arms, etc. All of the required hardware equipment is cumbersome to transport around. After being captured, a user manually edits the 3D model data to proper sizing using a software tool before importing the 3D model data into 3D computer graphics software. A 3D artist who specializes in 3D models manually edits the 3D model using the 3D computer graphics software. This process is carried out for each 3D model, which may be time consuming and costly.

SUMMARY

Implementations generally relate to 3-dimensional (3D) modeling using a client device. In some implementations, a system includes one or more processors, and includes logic encoded in one or more non-transitory computer-readable storage media for execution by the one or more processors. When executed, the logic is operable to cause the one or more processors to perform operations including: displaying a live video of a scene on a device with a user interface overlay on top of the scene, where the user interface overlay includes one or more objects and includes one or more selectable controls; receiving a selection of one or more new virtual points on a target object, where the target object is one object of the one or more objects in an image; and generating 3D polygonal data, where the 3D polygonal data is saved as a 3-dimensional (3D) model.

With further regard to the system, in some implementations, the logic when executed is further operable to cause the one or more processors to perform operations including enabling a user to enter the one or more new virtual points by tapping on the target object on a display screen. In some implementations, the target object represents a physical target object in a physical environment, where the physical target object is represented as a live video image on the device with a data overlay, and where each new virtual point shown in the data overlay of the one or more new virtual points approximates a physical point on the physical target object. In some implementations, the one or more new virtual points grouped as at least three virtual points to form a polygon, and the logic when executed is further operable to cause the one or more processors to perform operations comprising generating the 3D polygonal data based on the at least three new virtual points. In some implementations, the logic when executed is further operable to cause the one or more processors to perform operations comprising: combining the one or more new virtual points with existing virtual points; and generating the 3D polygonal data based on a combination of the one or more new virtual points and the existing virtual points. In some implementations, the logic when executed is further operable to cause the one or more processors to perform operations comprising: receiving a plurality of new virtual points from a plurality of client devices of a plurality of users; and generating the 3D polygonal data based on a combination of the plurality of new virtual points and existing virtual points. In some implementations, the logic when executed is further operable to cause the one or more processors to perform operations comprising: generating a polygon model based on the one or more new virtual points; and generating the 3D polygonal data in a specific 3D model format based on the polygon model.

In some embodiments, a non-transitory computer-readable storage medium with program instructions thereon is provided. When executed by one or more processors, the instructions are operable to cause the one or more processors to perform operations including: displaying a live video of a scene on a device with a user interface overlay on top of the scene, where the user interface overlay includes one or more objects and includes one or more selectable controls; receiving a selection of one or more new virtual points on a target object, where the target object is one object of the one or more objects in an image; and generating 3D polygonal data, and where the 3D polygonal data is saved as a 3-dimensional (3D) model.

With further regard to the computer-readable storage medium, in some implementations, the instructions when executed are further operable to cause the one or more processors to perform operations including enabling a user to enter the one or more new virtual points by tapping on the target object on a display screen. In some implementations, the target object represents a physical target object in a physical environment, where the physical target object is represented as a live video image on the device with a data overlay, and where each new virtual point shown in the data overlay of the one or more new virtual points approximates a physical point on the physical target object. In some implementations, the one or more new virtual points are grouped as at least three virtual points to form a polygon, and the instructions when executed are further operable to cause the one or more processors to perform operations comprising generating the 3D polygonal data based on the at least three new virtual points. In some implementations, the instructions when executed are further operable to cause the one or more processors to perform operations comprising: combining the one or more new virtual points with existing virtual points; and generating the 3D polygonal data based on a combination of the one or more new virtual points and the existing virtual points. In some implementations, the instructions when executed are further operable to cause the one or more processors to perform operations comprising: receiving a plurality of new virtual points from a plurality of client devices of a plurality of users; and generating the 3D polygonal data based on a combination of the plurality of new virtual points and existing virtual points. In some implementations, the instructions when executed are further operable to cause the one or more processors to perform operations comprising: generating a polygon model based on the one or more new virtual points; and generating the 3D polygonal data in a specific 3D model format based on the polygon model.

In some implementations, a method includes: displaying a live video of a scene on a device with a user interface overlay on top of the scene, where the user interface overlay includes one or more objects and includes one or more selectable controls; receiving a selection of one or more new virtual points on a target object, where the target object is one object of the one or more objects in an image; and generating 3D polygonal data, and where the 3D polygonal data is saved as a 3-dimensional (3D) model.

With further regard to the method, in some implementations, the method further includes enabling a user to enter the one or more new virtual points by tapping on the target object on a display screen. In some implementations, the target object represents a physical target object in a physical environment, where the physical target object is represented as a live video image on the device with a data overlay, and where each new virtual point shown in the data overlay of the one or more new virtual points approximates a physical point on the physical target object. In some implementations, the one or more new virtual points grouped as at least three virtual points to form a polygon, and the method further comprises generating the 3D polygonal data based on the at least three new virtual points. In some implementations, the method further includes: combining the one or more new virtual points with existing virtual points; and generating the 3D polygonal data based on a combination of the one or more new virtual points and the existing virtual points. In some implementations, the method further includes: receiving a plurality of new virtual points from a plurality of client devices of a plurality of users; and generating the 3D polygonal data based on a combination of the plurality of new virtual points and existing virtual points.

A further understanding of the nature and the advantages of particular implementations disclosed herein may be realized by reference of the remaining portions of the specification and the attached drawings.

DETAILED DESCRIPTION

Embodiments described herein enable, facilitate, and manage the 3D modeling using a mobile device. As described in more detail herein, in various embodiments, a system enables the roughing out or estimated modeling of 3D objects in a life-size scale. Embodiments enable multiple users to directly enter model data at the same time independently and in a cooperative manner.

Figure 1:
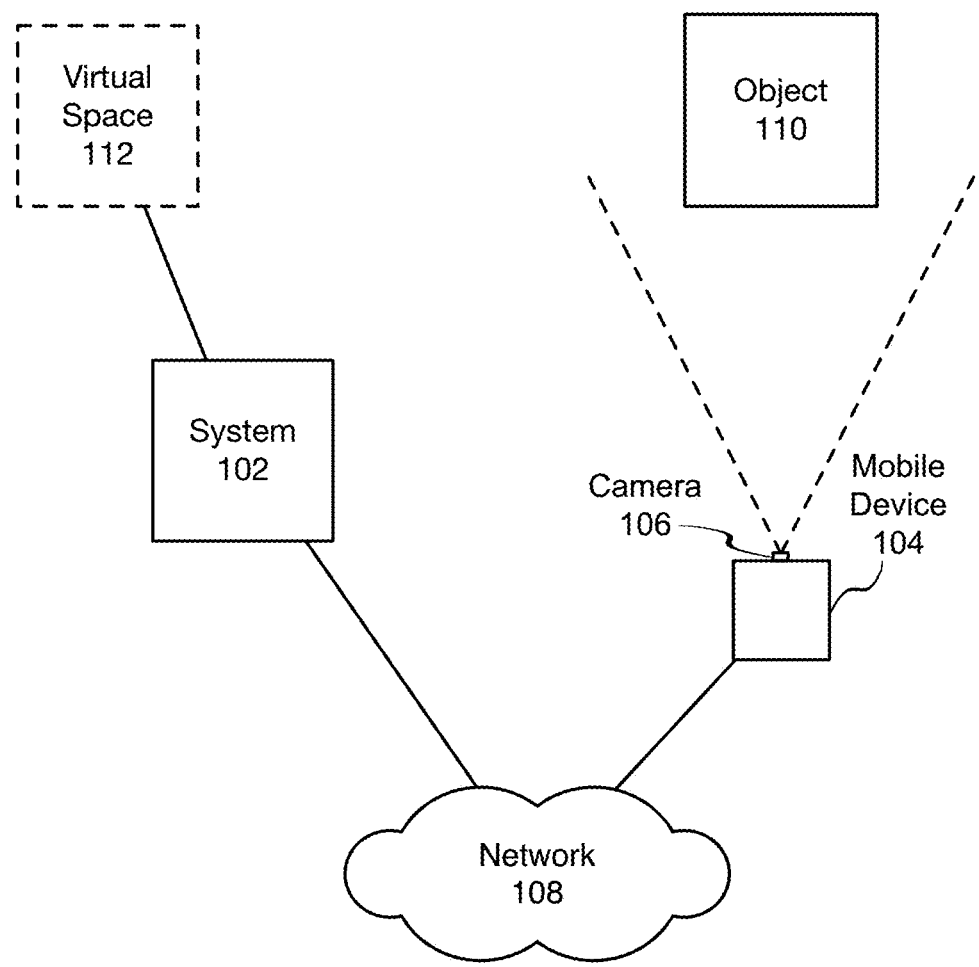
FIG. 1 is a block diagram of an example environment where a client device is used for 3-dimensional (3D) modeling, which may be used for some implementations described herein.

FIG. 1 is a block diagram of an example environment 100 where a client device is used for 3-dimensional (3D) modeling, which may be used for some implementations described herein. In some implementations, environment 100 includes a system 102 and a client device or mobile device 104, which includes a camera 106. Environment 100 also includes a network 108 through which system 102 and mobile device 104 communicate. Network 108 may be any suitable communication network such as a Wi-Fi network, Bluetooth network, the Internet, etc.

While various embodiments are described in the context of a smart phone being used for 3D modeling, mobile device 104 may represent different types of mobile devices that have a camera or access to a camera (e.g., smart phones, tablets, stand-along cameras, personal assistant devices, wearable devices, laptop computers, etc.). Any mobile device that supports drawing lines while showing a video from the mobile device's camera in the background may be used. In various embodiments, system 102 may operate with an augmented reality application on mobile device 104, where the user can step back and look at a target object while walking around it and by viewing it on the mobile device. Motion sensors on the device are used to position vertices provided mobile device 104 within a 3D augmented reality.

In various embodiments, system 102 enables a user to contribute 3D geometry data using mobile device 104, such as a smart phone, tablet, etc. The user moves mobile device 104 to various locations around a target object 110, where target object 110 is a physical target object in a scene of a physical environment. In various embodiments, system 102 obtains a perspective of the scene in the physical environment via camera 106 of mobile device 104. The perspective is stored as an image that includes the scene and target object 110. System 102 renders an image of the scene including at least target object 110 on a display screen of mobile device 104.

As described in more detail below, system 102 receives the 3D model data from mobile device 104. In various embodiments, the 3D model data includes one or more new virtual points on target object 110, where system 102 enables the user to add the virtual points by selecting or tapping on portions of target object rendered on the display screen of mobile device 104. System 102 generates a 3D model based at least in part on the new virtual points. Further embodiments directed to the building of the 3D model are described in more detail herein. Also shown is a virtual space 112, where polygonal data exists. In various embodiments, virtual space 112 maps the polygonal data to the physical location of the target object.

For ease of illustration, FIG. 1 shows one block for each of system 102, mobile device 104, network 108, and object 110. Blocks 102, 104, 108, and 110 may represent multiple systems, mobile devices, networks, and objects. In other implementations, environment 100 may not have all of the components shown and/or may have other elements including other types of elements instead of, or in addition to, those shown herein.

While system 102 performs embodiments described herein, in other embodiments, any suitable component or combination of components associated with system 102 and/or any suitable processor or processors associated with system 102 may facilitate performing the embodiments described herein. Also, system 102 may operation in cooperation with various client devices such as mobile device 104 to implement embodiments described herein.

Figure 2:
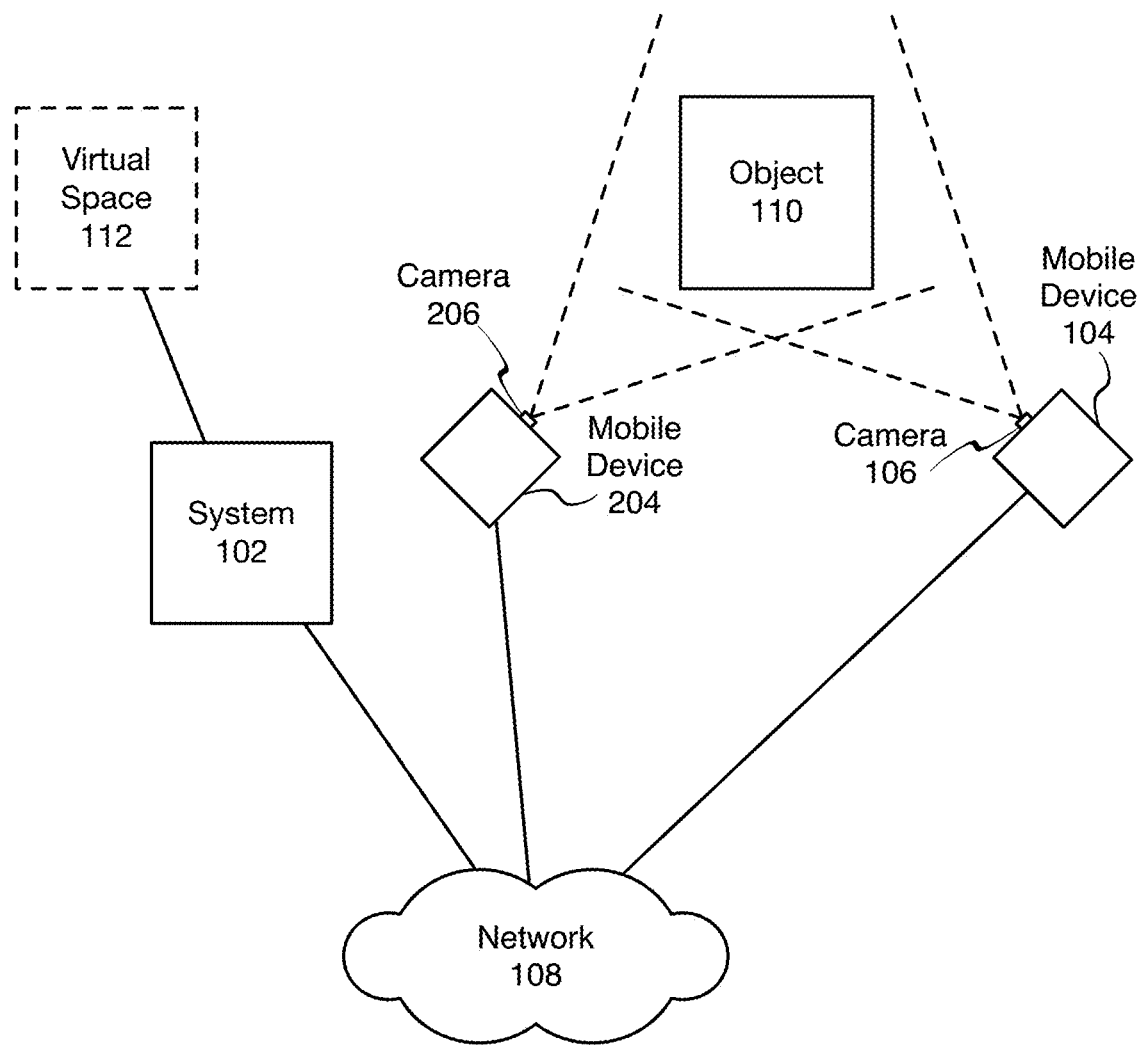
FIG. 2 is a block diagram of an example environment where two client devices are used for 3D modeling, which may be used for some implementations described herein.

FIG. 2 is a block diagram of an example environment 200 where two client devices are used for 3D modeling, which may be used for some implementations described herein. FIG. 2 shows the same elements as those shown in FIG. 3 but with an additional client device or mobile device 204, which has a camera 206. As shown, each of mobile devices 104 and 204 is operated by a different user, and mobile devices 104 and 204 capture videos of object 110 from different perspectives.

As indicated above, virtual space 112 maps the polygonal data to the physical location of the target object. In some embodiments, each of mobile devices 104 and 204 may each be associated with a different virtual space. In some embodiments, each of mobile devices 104 and 204 may each be associated with the same virtual space. In various embodiments, a given virtual space may be associated with one or more mobile devices. Also, different sets of mobile devices may be associated with different virtual spaces.

Figure 3:
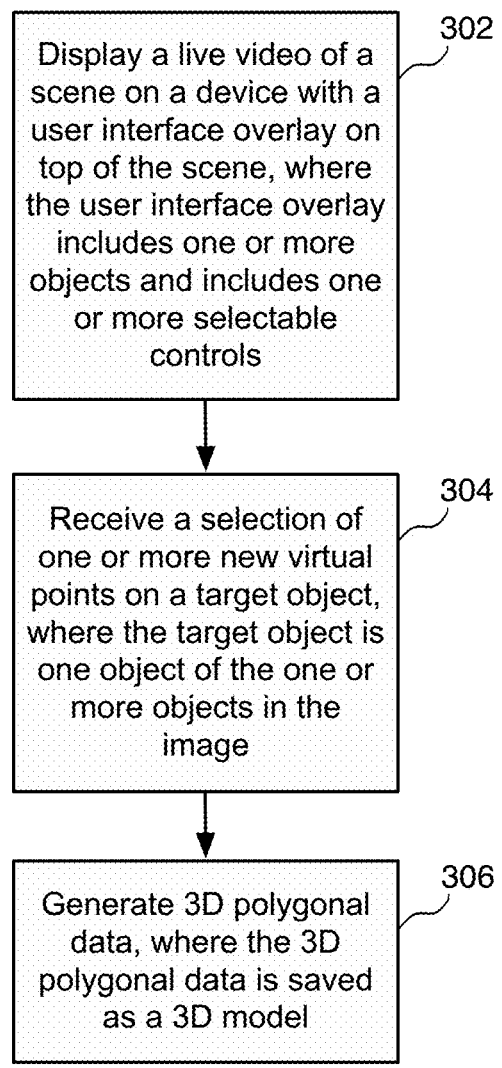
FIG. 3 is an example flow diagram for 3D modeling using a client device, according to some implementations.
Figure 4:
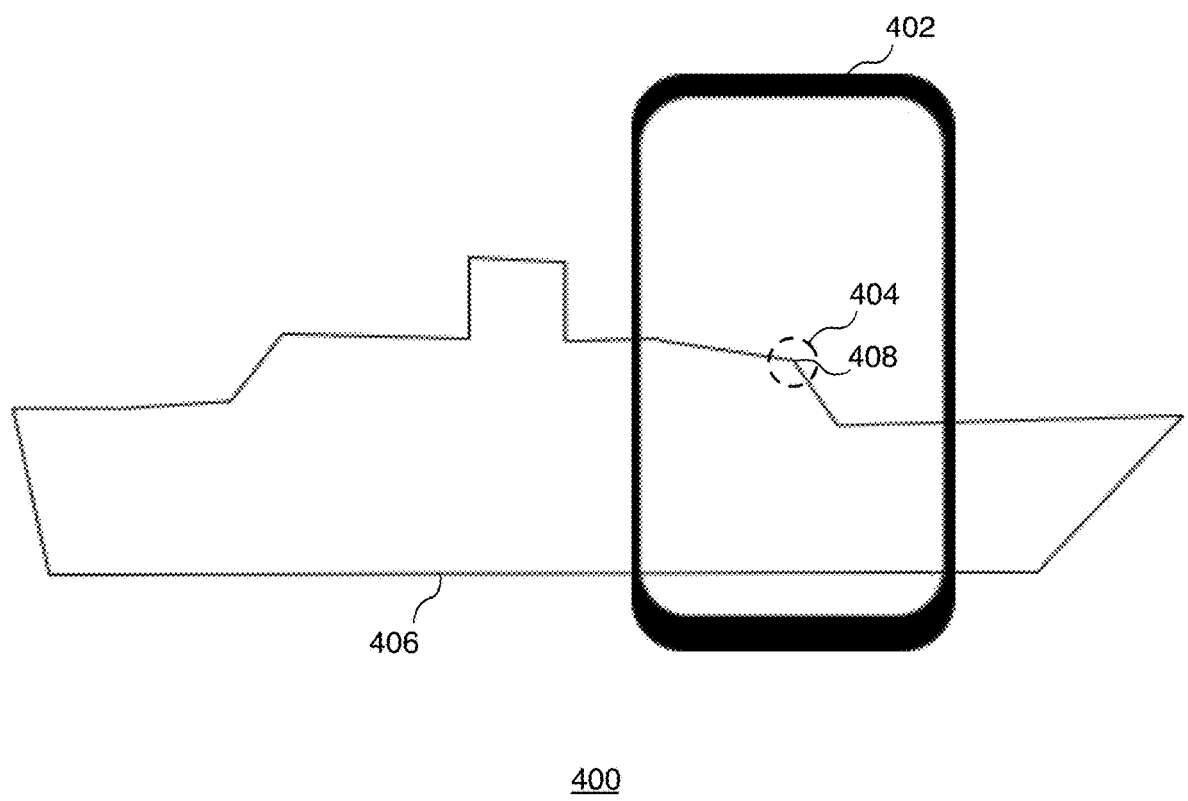
FIG. 4 is a block diagram of an example scenario, where a mobile device having a controllable virtual point is being used for 3D modeling of a target object, according to some implementations.

FIG. 3 is an example flow diagram for 3D modeling using a client device, according to some implementations. Referring to both FIGS. 1, 2, and 3, a method is initiated at block 302, where a system such as system 102 displays a live video of a scene on a device with a user interface overlay on top of the scene, where the user interface overlay includes one or more objects and includes one or more selectable controls. In various embodiments, the background image on the device is live video from the device camera. FIG. 4 below illustrates this step.

FIG. 4 is a block diagram of an example scenario 400, where mobile device 402 has a controllable virtual point 404 that is being used for 3D modeling of a target object 406, according to some implementations. In this particular example, mobile device 402 is a smart phone. Although the implementations disclosed herein are described in the context of a smart phone, the implementations may also apply to any type of mobile or client device that has a camera or access to a camera. In this example, mobile device 402 is a cell phone with an augmented reality application. In various embodiments, the system operates in combination with the augmented reality application of mobile device 402 to implement embodiments described herein.

In various embodiments, the system obtains a perspective of the scene in the physical environment via mobile device 402, which captures one or more images of the perspective, including a portion of target object 408 in the distance. In various embodiments, the system obtains the one or more images in the form of a video. In various embodiments, the system obtains the one or more images in the form of individual images, snapshots, bursts, etc. The particular form may vary, and will depend on the particular implementation. In various embodiments, the system may process and analyze images of the perspective including the target object image-by-image, or frame-by-frame. The camera on mobile device 402 provides an augmented reality view of target object 406 that is used to enter and edit 3D mesh data. As indicated above, the system obtains the perspective of the scene using a camera to capture an image of target object 406 as a part of the perspective of the scene. In various embodiments camera 402 captures multiple images in the form of a video.

As shown in FIG. 4, the system renders the image of the scene, and causes or enables mobile device 402 to display the image of the scene on the display screen of mobile device 402. While the image shows target object 406, the image may include any one or more objects, whole or in part, depending on the perspective. As described in more detail herein, the system enables mobile device 402 to capture and edit 3D wireframe data.

In various embodiments, the system enables the user to change the position of mobile device 402, including moving mobile device 402 closer to or farther away from target object 406, and including rotating mobile device 402. This enables mobile device 402 to capture different portions of target object 406 at different angles.

In various embodiments, the size of controllable virtual point 404 may change based on the distance between mobile device 402 and portion 408 of target object 406. For example, in some embodiments, the system may increase the size of controllable virtual point 404 if the distance between mobile device 402 and portion 408 increases. Conversely, the system may decrease the size of controllable virtual point 404 if the distance between mobile device 402 and portion 408 decreases.

In some embodiments, the system may show the numerical distance between the mobile device and the target object on the mobile device next to the controllable virtual point. In some embodiments, the user may set the distance. In some embodiments, the mobile device may set the distance using any suitable techniques.

Figure 5:
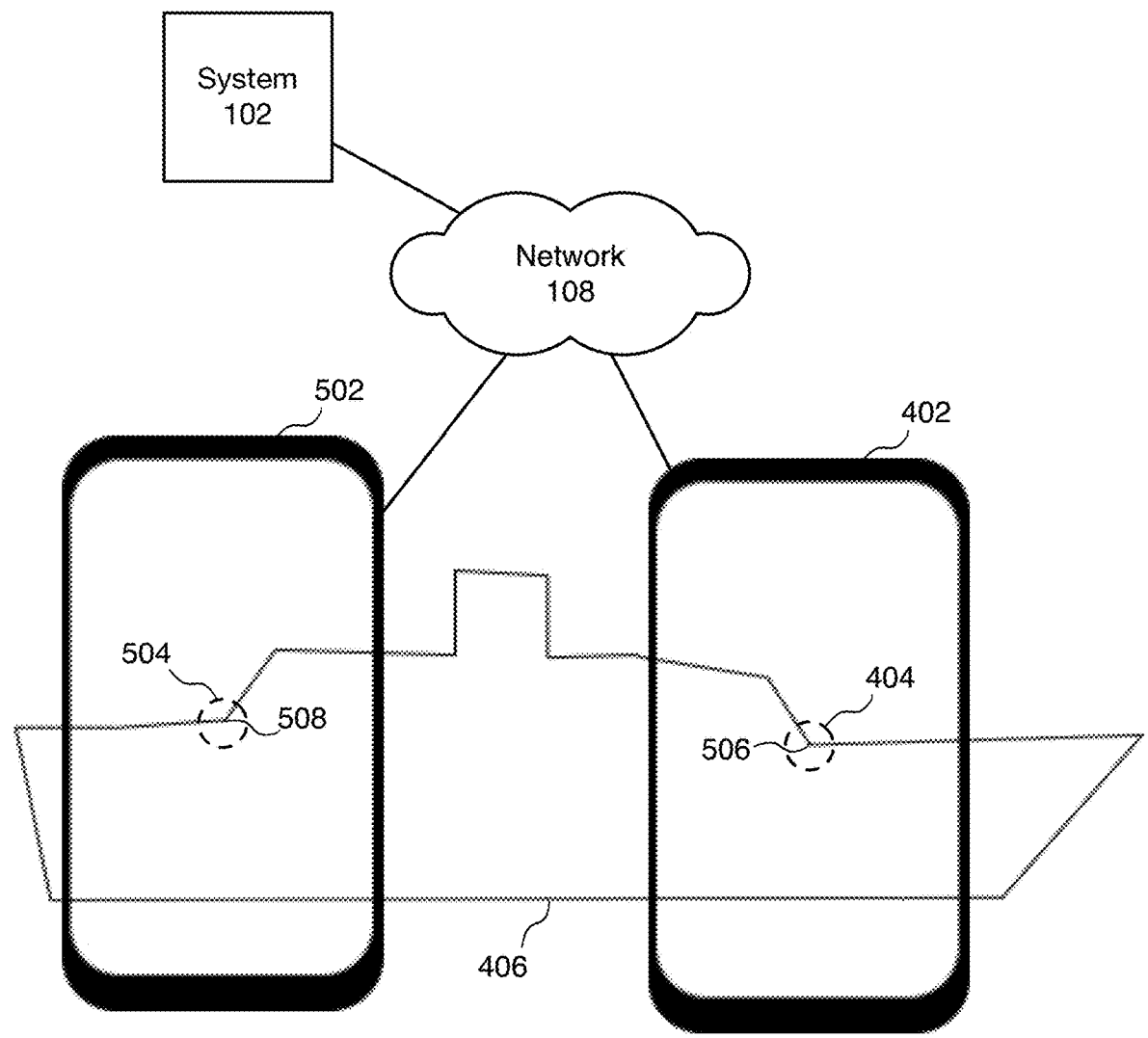
FIG. 5 is a block diagram of an example scenario, where a first mobile device and a second mobile device are both being used for 3D modeling a shared data representation of a target object, according to some implementations.

While some embodiments are described in the context of a single mobile device being used for building 3D models of target objects, these embodiments also apply to multiple mobile devices of multiple respective users being used to build the same 3D model of the same target object, as illustrated in FIG. 5 below.

FIG. 5 is a block diagram of an example scenario 500, where mobile device 402 and a second mobile device 502 are both being used for 3D modeling a shared data representation of a target object 406, according to some implementations. Mobile device 502 also includes a controllable virtual point 504 being displayed. As shown, each of mobile devices 402 and 502 captures an image or video of different respective portions 506 and 508 of target object 406, and system 102 may obtain/receive these images sent from mobile devices 402 and 502 via network 108.

In various embodiments, the system 102 stores 3D model data received from mobile devices 402 and 502, where the 3D model data is common data model (e.g., common to the same object). In various embodiments, the system collects and stores such 3D model data in the cloud, allowing multiple users to cooperatively add 3D model data to the 3D model.

Furthermore, in various embodiments, system 102 may obtain multiple images from each of mobile devices 402 and 502 in order for the system to build a 3D model of target object 406. For example, portion 506 of target object 406 captured by mobile device 402 shown in FIG. 5 is different from portion 408 of the same target object 406 captured by the same mobile device 402 shown in FIG. 4.

As described in more detail herein, system 102 enables multiple users to edit the same 3D model as it exists in system 102 or on a server accessible by system 102. This allows several users with mobile devices to cooperatively work on entering the 3D model data. The camera on the mobile device is used to create an augmented reality effect where triangle meshes being created appear overlaid into the real world on the mobile device's display screen.

Figure 6:
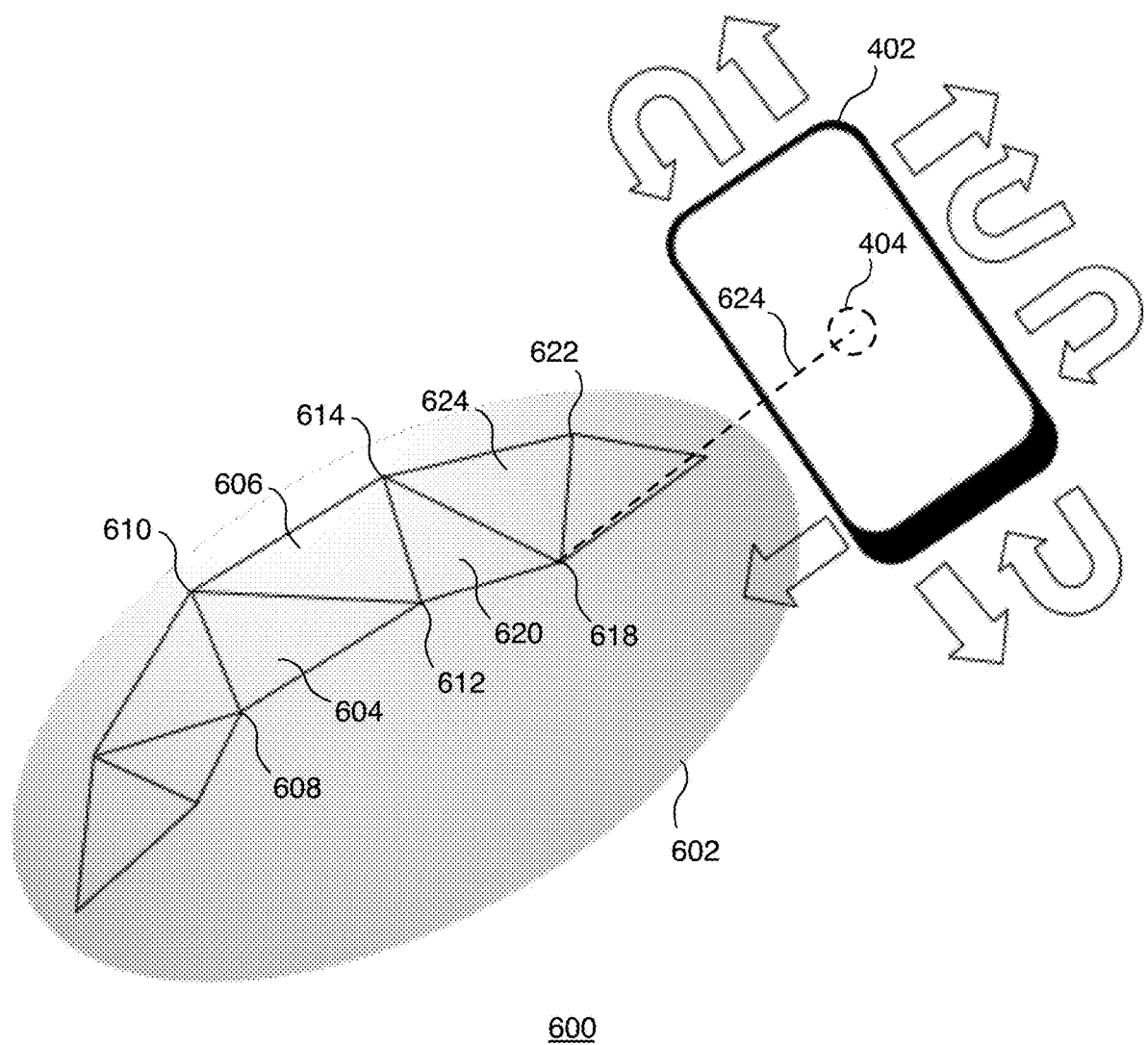
FIG. 6 is a block diagram of an example scenario, where a mobile device is being used to add 3D model data points to a 3D model, according to some implementations.

At block 304, the system receives a selection of one or more new virtual points on a target object, where the target object is one object of the one or more objects in the image. FIG. 6 below illustrates this step.

FIG. 6 is a block diagram of example scenario 600, where mobile device 402 is being used to add 3D model data points to a 3D model 602, according to some implementations. In this example embodiment, 3D model 602 represents a 3D model of target object 406 of FIGS. 4 and 5.

Shown in 3D model 602 are triangles 604 and 606, among other triangles. Each triangle has 3 connected vertices. For example, triangle 604 has vertices 608, 610, and 612. As shown, vertex 610 and vertex 612 are shared by or common to triangles 604 and 606. The system generates triangle 606 by adding vertex 614. As a result, triangle 606 has vertices 610, 612, and 614.

In various embodiments, the system collects 3D model data as the user changes positions, rotation, and orientation of the mobile device while capturing different images from different perspectives. The system may utilize various motion tracking techniques and accelerometers in order to keep new 3D model data consistent with existing 3D model data that the system has already collected, and the polygonal data remains stable in the virtual space. That is, the 3D model being created remains at the same position in the augmented reality space regardless of how the mobile device is moved around. For example, if the system creates a wireframe model of a building, the system ensures that the wireframe data will appear to remain at the same location on the building as the user walks around and add or edits the data. This is achieved by the system tracking the locations, positions, rotation, and orientation of the mobile device position in space and adjusting the position of the wireframe so that the wireframe remains at the location where the wireframe was created. In various embodiments, when moving or editing the relative motion of the mobile device controls, the editing operation may include 3D motion or rotation to lace the selection in the new orientation.

As described above, in various embodiments, the system enables the user to enter the one or more new virtual points by tapping on the target object on the display screen. Generally, the system enables one or more mobile devices operated by one or more respective users to add or select new virtual points to represent physical points on a target object. In this example, the user adds a 3D model data point by tapping on a virtual point of the target object shown in the image displayed on mobile device 402. For example, the user may tap on controllable virtual point 404 on the display screen to indicate a virtual point on the rendered image. The dashed line 624 represents the distance between mobile device 402 or controllable virtual point 404 and the target object. In various embodiments, the polygons appear on top of the target object, not depicted as a 2D drawing on mobile device 402. As such, the user looks views the target object on mobile device 402 to see the 3D polygonal data overlaid over the target object.

In various embodiments, virtual point 616 and any other user-selected virtual points are set at controllable virtual distances from the camera of mobile device 402. As described herein, vertices are added end-to-end to create an outline of the target object. As described in more detail below in connection with FIGS. 9 and 10, the system enables the user to select existing vertices for editing. Other example modes may include triangle strips, triangle fans, etc. For example, a triangle fan is where a triangle is made from the new vertex, an existing vertex, and a previous vertex. In some embodiments, the user can indicate for the system to stop or start entering a set of triangles, and the user can indicate for the system to connect vertices by a line. 3D model data gathered by the system may be exported to the formats used by various 3D modeling tools.

In some embodiments, the system may enable the user to select a given virtual point by holding down the user's finger on a given point in the image for a predetermined amount of time (e.g., a predetermined fraction of a second, one second, etc.), or by hard pressing, or by other selection techniques.

As indicated herein, in various embodiments, the target object represents a physical target object in the physical environment, where the physical target object is represented as a live video image on the device with a data overlay. In various embodiments, each new virtual point shown in the data overlay of the one or more new virtual points approximates a physical point on the physical target object.

In various embodiments, the system converts each virtual point to a vertex on a triangle. The user may move the mobile device to different physical locations to select or add different virtual points, which ultimately become corresponding vertices of triangles of a 3D model.

The system obtains or receives the location of each virtual point relative to other virtual points of the target object. The system generates a new vertex 618 based on the selection of controllable virtual point 404. The system connects or adds vertex 618 to vertex 612 and to vertex 614 to construct a new triangle 620. Similarly, the system connects or adds vertex 622 to vertex 614 and to vertex 618 to construct a new triangle 624. As such, the system obtains numerous 3D data points corresponding to user-selected virtual points, and converts those virtual points to vertices and ultimately triangles of a 3D mesh as shown.

At block 306, the system generates 3D polygonal data, where the 3D polygonal data is saved as a 3D model. Referring still to FIG. 6, the system generates the 3D model by constructing a geometric mesh of triangles, which are based on vertices, which are based on user-selected virtual points, as described. In various embodiments, the 3D polygon data is data that may be saved in any 3D format such as COLADA, Blender, Lightwave, MAYA, etc. The system may also import and read 3D model data saved in various formats.

In various embodiments, to start construction of the 3D model, the initial new virtual points include at least three new virtual points that are grouped as at least three new virtual points in order to form or construct the first polygon or triangle. As such the system generates the 3D polygonal data based on the at least three new virtual points. The system continues to add new triangles by combining one or more new virtual points with existing virtual points. The system then generates the 3D polygonal data based on a combination of the one or more new virtual points and the existing virtual points. Adding or combining new vertices to existing vertices expands the existing 3D model. For example, a given user may move his or her mobile device to new physical locations surrounding the physical target object in order to add one or more new virtual points from each perspective, and from multiple perspectives.

In various embodiments, the system may receive new virtual points from multiple client devices of multiple users. The system then generates the 3D polygonal data based on a combination of the new virtual points and the existing virtual points. For example, each of the users of mobile devices 402 and 502 of FIG. 5 may each independently contribute 3D data to the 3D model simultaneously in parallel and or at different times.

The resulting triangles represent different geometric aspects in a 3D mesh of the 3D model. For example, any given user may use any given mobile device to select a virtual point that the system converts to a vertex that the system uses to construct a triangle (e.g., triangle 624).

As described in more detail herein, in various embodiments, the system constructs a 3D geometric mesh with triangles in a 3D virtual space. These triangles are formed from different combinations of three vertices. The system generates the 3D model of the target object based on the 3D geometric mesh. The system may subsequently store or send the 3D model to other systems for further 3D modeling and/or rendering.

While various embodiments are described in the context of the 3D mesh being composed on triangles, these embodiments and others also apply to 3D meshes being composed of other types of polygons (e.g., squares, rectangles, trapezoids, etc.). In various embodiments, the system generates a 3D polygon model based on the one or more new virtual points. The system then generates the 3D polygonal data in a specific 3D model format based on the polygon model.

In some embodiments, the system may be used to trace out large physical objects in 3D. Embodiments may also be used to enter data for non-physical objects. For example, 3D model data may represent nodes or layers in an arrangement meant for a neural network configuration. In another implementation, 3D model data may represent a data relationship model or models for big data. Embodiments also enable a user to view and edit a set of relationships in 3D while walking around "in" the data and to collaborate with other users to provide 3D model data.

Although the steps, operations, or computations may be presented in a specific order, the order may be changed in particular implementations. Other orderings of the steps are possible, depending on the particular implementation. In some particular implementations, multiple steps shown as sequential in this specification may be performed at the same time. Also, some implementations may not have all of the steps shown and/or may have other steps instead of, or in addition to, those shown herein.

Figure 7:
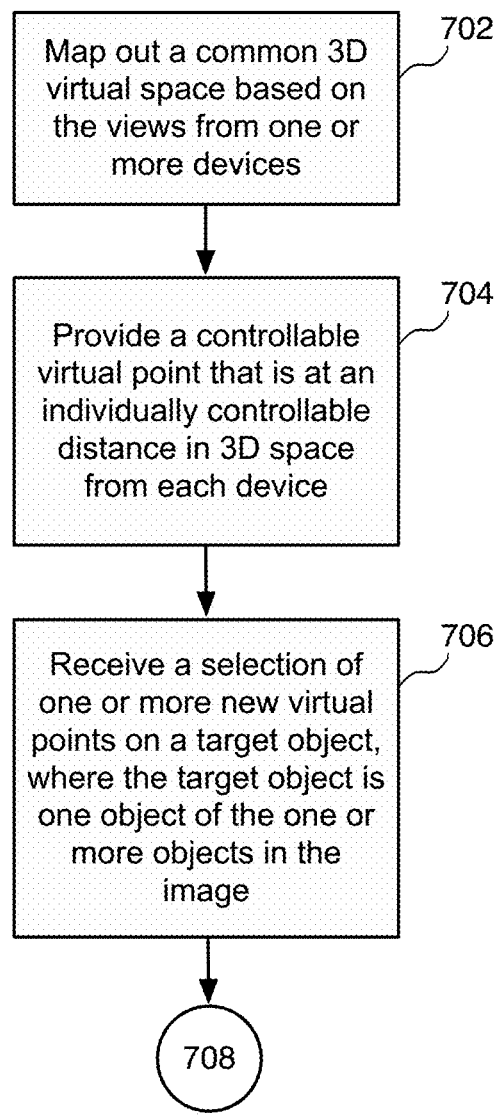
FIG. 7 is an example flow diagram for 3D modeling using a client device, according to some implementations.

FIG. 7 is an example flow diagram for 3D modeling using a client device, according to some implementations. In various embodiments, a method is initiated at block 702, where a system such as system 102 maps out a common 3D virtual space based on the views from one or more devices.

At block 704, the system provides a controllable virtual point that is at an individually controllable distance in 3D space from each device.

At block 706, the system receives a selection of one or more new virtual points on a target object, where the target object is one object of the one or more objects in the image.

Figure 8:
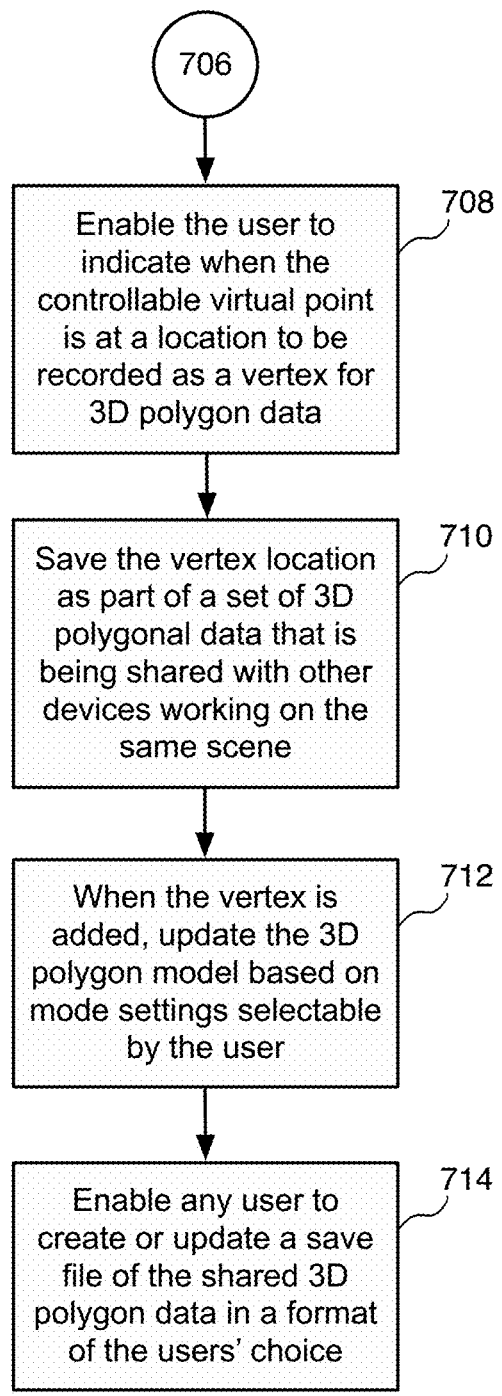
FIG. 8 is an example flow diagram for 3D modeling using a client device, continuing from FIG. 7, according to some embodiments.

FIG. 8 is an example flow diagram for 3D modeling using a client device, continuing from FIG. 7, according to some embodiments. At block 708, the system enables the user to indicate when the controllable virtual point is at a location to be recorded as a vertex for 3D polygon data.

At block 710, the system saves the vertex location as part of a set of 3D polygonal data that is being shared with other devices working on the same scene.

At block 712, when the vertex is added, the system updates the 3D polygon model based on mode settings selectable by the user.

At block 714, the system enables any user to create or update a save file of the shared 3D polygon data in a format of the users' choice.

Figure 9:
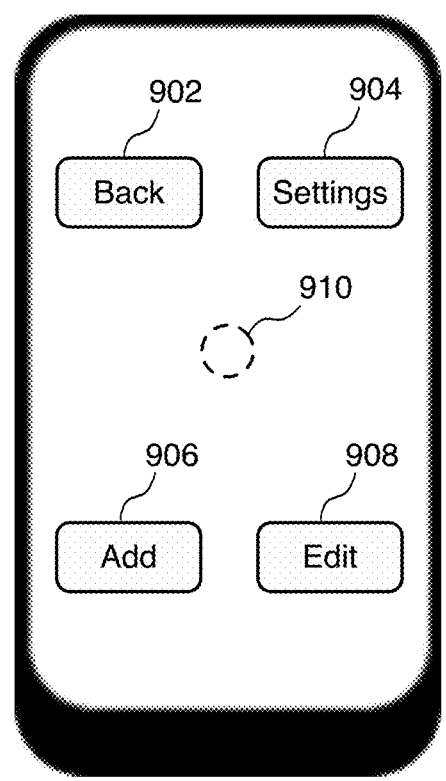
FIG. 9 is a block diagram of an example user interface of a mobile device, according to some implementations.

FIG. 9 is a block diagram of example user interface of a mobile device 900, according to some implementations. Mobile device 900 may be used to represent other mobile devices such as mobile device 402 or mobile device 502 of FIG. 5. Shown are a back button 902, a settings button 904, an add button 906, and an edit button 908. Also shown is an example virtual point 910 controllable by the user. The virtual point 910 is set at a distance into the 3D virtual space. As indicated above, in some embodiments the system enables the user to set the distance. Alternatively, the system may set the distance. As the phone is moved, the virtual 3D space is tracked and portrayed to remain in a stable position relative to the object being viewed. Controllable virtual point 910 is placed on the surface of the object on the screen of mobile device 402, as shown in FIG. 5, and a selection is made to capture that 3D location as a vertex addition to the 3D polygonal data. The operation may be shared in the same virtual space by multiple users.

In various embodiments, the system may provide new virtual buttons and/or enable existing (virtual or physical) buttons on the phone to be used to control features of the augmented reality application. For example, in various embodiments, back button 902 is used to return to the previous set of button selections. In some embodiments, back button 902 brings up a dialog box asking if the user wishes to exit the application. In various embodiments, settings button 904 enables the user to control the minimum and maximum range of a virtual point or vertex point, control the transparency of the buttons and other settings associated with connecting the mobile device to the system in order to provide 3D model data. Controlling the transparency of the buttons enables the user to view the scene rendered behind the buttons.

In various embodiments, virtual buttons shown on mobile device 900 by the application may be used to provide mode sensitive selections such as add vertex and edit vertex. For example, in various embodiments, add button 906 provides a user interface to add virtual points (i.e., add vertices in the augmented reality space). In other example embodiments, edit button 908 may provide a user interface to edit virtual points (i.e., edit vertices in the augmented reality space). In another example embodiment, the system may enable existing volume buttons of the mobile device 900 to be used to control the distance from mobile device 900 to the virtual point where vertices are added or edited.

Figure 10:
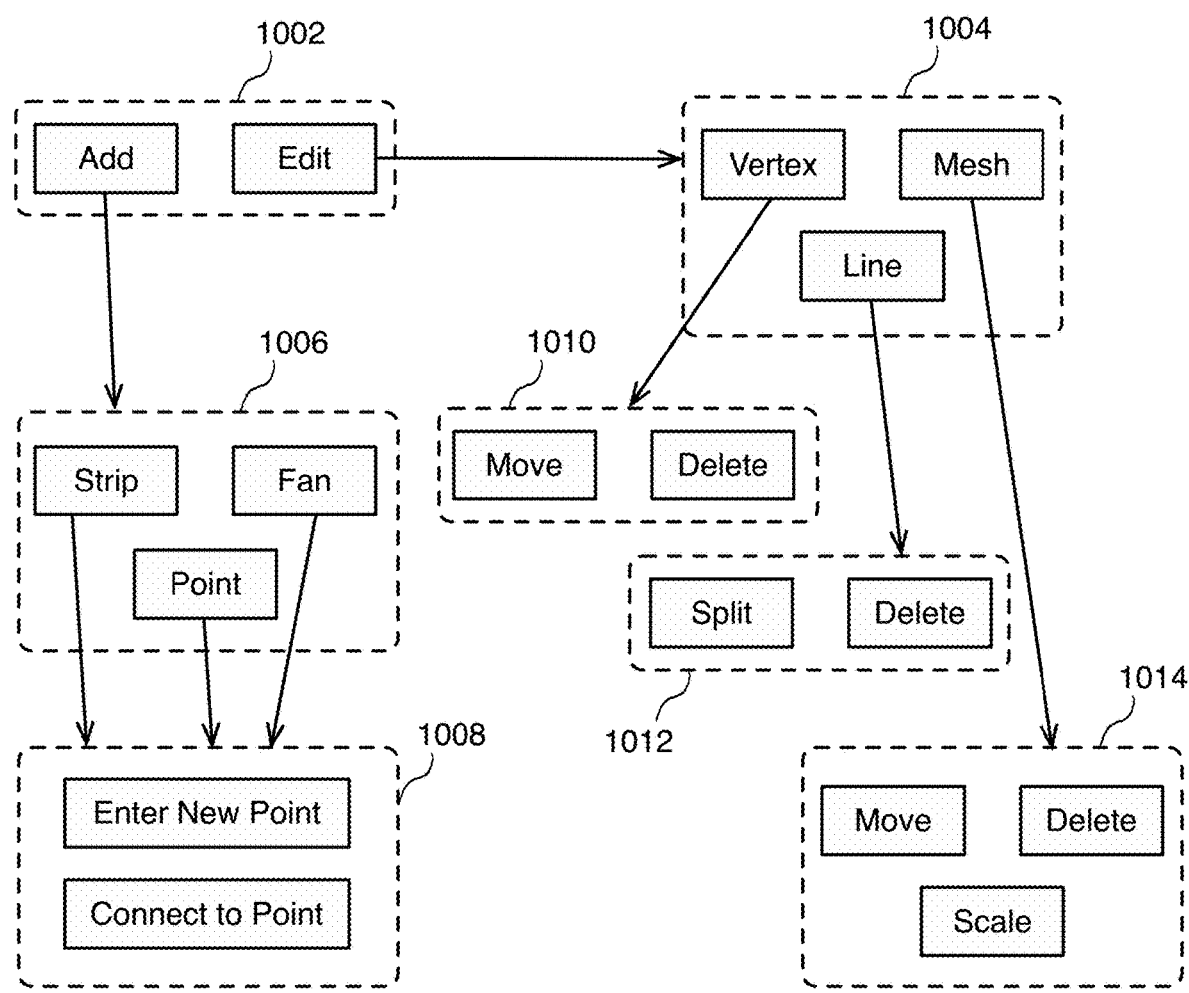
FIG. 10 is a block diagram of example user interfaces of a mobile device, according to some implementations.

FIG. 10 is a block diagram of example user interfaces of a mobile device, according to some implementations. Shown are user interfaces 1002, 1004, 1006, 1008, 1010, 1012, and 1014. In various embodiments, when the user selects a button such as the add button in user interface 1002, the system brings up and causes user interface 1006 with a new set of buttons to be displayed. In this example, when the user selects any of the buttons in user interface 1006, the system brings up and causes user interface 1008 with a new set of buttons to be displayed.

The particular new interface that appears and chain of user interfaces may vary, depending on the particular implementation. For example, when the user selects a button such as the edit button in user interface 1002, the system brings up and causes user interface 1004 with a new set of buttons to be displayed. In this example, when the user selects the vertex button in user interface 1004, the system brings up and causes user interface 1010 with a new set of buttons to be displayed. When the user selects the line button in user interface 1004, the system brings up and causes user interface 1012 with a new set of buttons to be displayed. When the user selects the mesh buttons in user interface 1004, the system brings up and causes user interface 1014 with a new set of buttons to be displayed.

In various embodiments, the elements shown are standard fare for editing 3D vertex data. Various embodiments described herein, provide an augmented reality application to a handheld mobile device (e.g., smart phone, tablet, etc.)

that keeps the 3D model data in the cloud so that other users can work on the same target object substantially at the same time.

Embodiments described herein provide various benefits. For example, embodiments enable users to rough or estimate the modeling of 3D objects in a life-size scale. Embodiments also enable multiple users to directly enter model data at the same time independently and in a cooperative manner.

Figure 11:
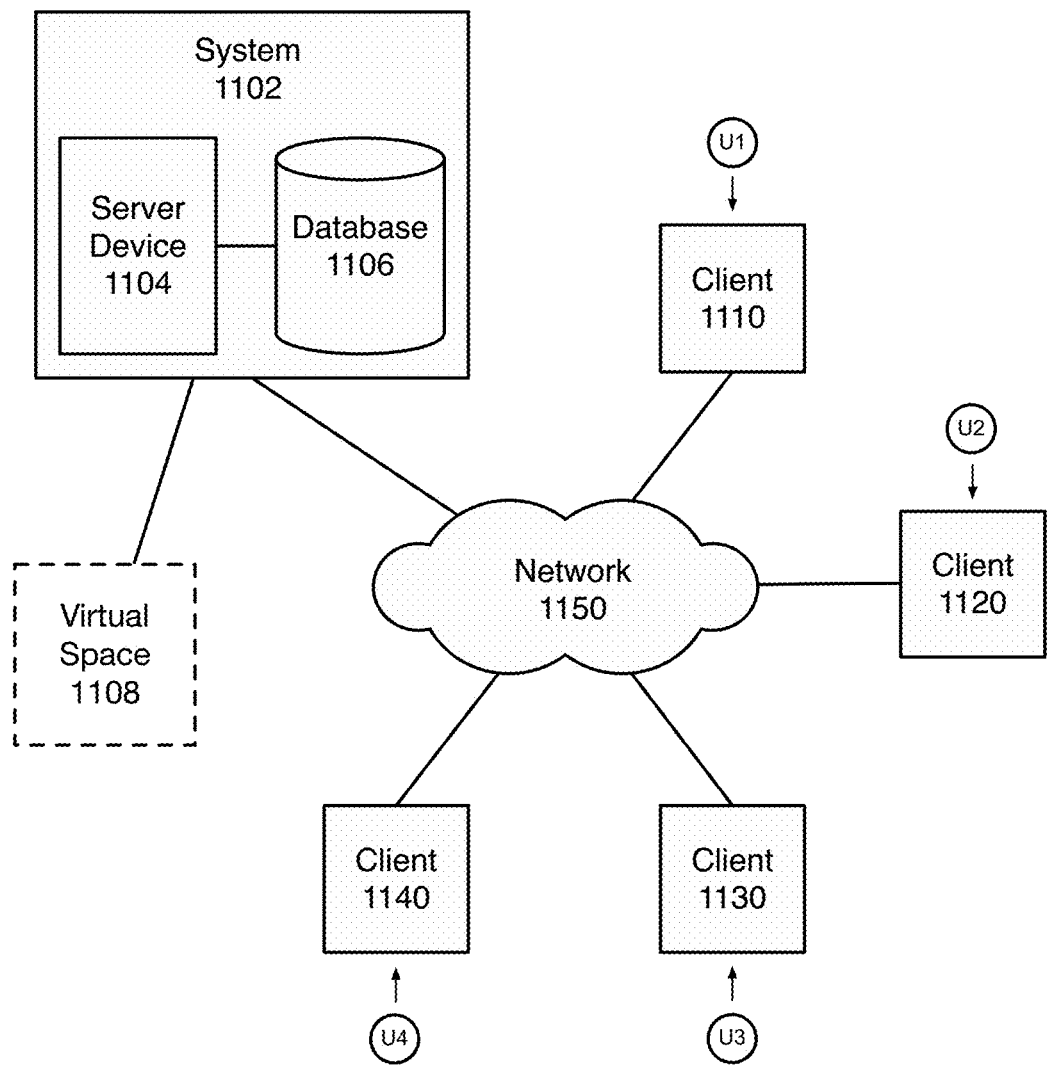
FIG. 11 is a block diagram of an example network environment, which may be used for some implementations described herein.

FIG. 11 is a block diagram of an example network environment 1100, which may be used for some implementations described herein. In some implementations, network environment 1100 includes a system 1102, which includes a server device 1104, a database 1106, and a virtual space 1108. For example, system 1102 may be used to implement system 102 of FIGS. 1 and 4, as well as to perform embodiments described herein. Network environment 1100 also includes client devices 1110, 1120, 1130, and 1140, which may communicate with system 1102 and/or may communicate with each other directly or via system 1102. Network environment 1100 also includes a network 1150 through which system 1102 and client devices 1110, 1120, 1130, and 1140 communicate. Network 1150 may be any suitable communication network such as a Wi-Fi network, Bluetooth network, the Internet, etc.

As indicated above, in some embodiments, all users' mobile devices may operate in the same virtual space. In some embodiments, different groups of users or individual users' may operate in their own instance of a virtual space. It is also possible for an individual user to hold his or her virtual space within his or her mobile device and upload the 3D saved data at a later time. A user may use the system in a location where Internet connection is unreliable, poor, or just not available. By setting up a "local hot spot" on his or her mobile device, a user may share his or her local virtual space on his or her device with others so he or she can cooperate on capturing the 3D data.}

For ease of illustration, FIG. 11 shows one block for each of system 1102, server device 1104, and network database 1106, and shows four blocks for client devices 1110, 1120, 1130, and 1140. Blocks 1102, 1104, and 1106 may represent multiple systems, server devices, and network databases. Also, there may be any number of client devices. In other implementations, environment 1100 may not have all of the components shown and/or may have other elements including other types of elements instead of, or in addition to, those shown herein.

While server device 1104 of system 1102 performs embodiments described herein, in other embodiments, any suitable component or combination of components associated with system 1102 or any suitable processor or processors associated with system 1102 may facilitate performing the embodiments described herein.

In the various embodiments described herein, a processor of system 1102 and/or a processor of any client device 1110, 1120, 1130, and 1140 cause the elements described herein (e.g., information, etc.) to be displayed in a user interface on one or more display screens.

Figure 12:
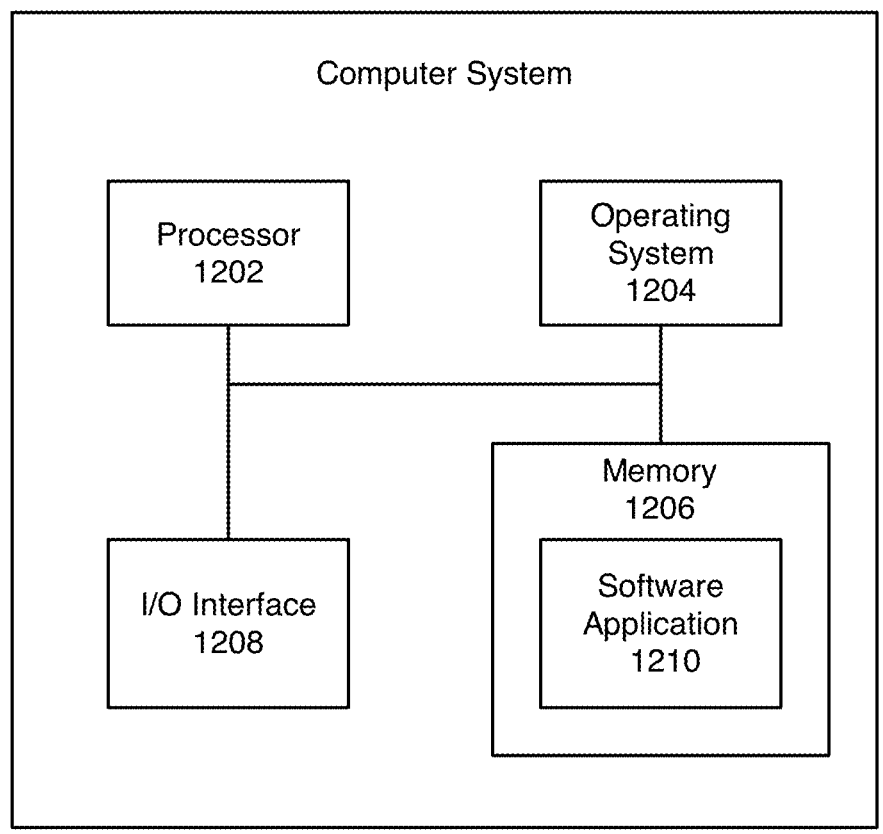
FIG. 12 is a block diagram of an example computer system, which may be used for some implementations described herein.

FIG. 12 is a block diagram of an example computer system 1200, which may be used for some implementations described herein. For example, computer system 1200 may be used to implement server device 1104 of FIG. 11 and/or system 102 of FIGS. 1, 2, and 5, as well as to perform embodiments described herein. In some implementations, computer system 1200 may include a processor 1202, an operating system 1204, a memory 1206, and an input/output (I/O) interface 1208. In various implementations, processor 1202 may be used to implement various functions and features described herein, as well as to perform the method implementations described herein. While processor 1202 is described as performing implementations described herein, any suitable component or combination of components of computer system 1200 or any suitable processor or processors associated with computer system 1200 or any suitable system may perform the steps described. Implementations described herein may be carried out on a user device, on a server, or a combination of both.

Computer system 1200 also includes a software application 1210, which may be stored on memory 1206 or on any other suitable storage location or computer-readable medium. Software application 1210 provides instructions that enable processor 1202 to perform the implementations described herein and other functions. Software application may also include an engine such as a network engine for performing various functions associated with one or more networks and network communications. The components of computer system 1200 may be implemented by one or more processors or any combination of hardware devices, as well as any combination of hardware, software, firmware, etc.

For ease of illustration, FIG. 12 shows one block for each of processor 1202, operating system 1204, memory 1206, I/O interface 1208, and software application 1210. These blocks 1202, 1204, 1206, 1208, and 1210 may represent multiple processors, operating systems, memories, I/O interfaces, and software applications. In various implementations, computer system 1200 may not have all of the components shown and/or may have other elements including other types of components instead of, or in addition to, those shown herein.

Although the description has been described with respect to particular embodiments thereof, these particular embodiments are merely illustrative, and not restrictive. Concepts illustrated in the examples may be applied to other examples and implementations.

In various implementations, software is encoded in one or more non-transitory computer-readable media for execution by one or more processors. The software when executed by one or more processors is operable to perform the implementations described herein and other functions.

Any suitable programming language can be used to implement the routines of particular embodiments including C, C++, Java, assembly language, etc. Different programming techniques can be employed such as procedural or object oriented. The routines can execute on a single processing device or multiple processors. Although the steps, operations, or computations may be presented in a specific order, this order may be changed in different particular embodiments. In some particular embodiments, multiple steps shown as sequential in this specification can be performed at the same time.

Particular embodiments may be implemented in a non-transitory computer-readable storage medium (also referred to as a machine-readable storage medium) for use by or in connection with the instruction execution system, apparatus, or device. Particular embodiments can be implemented in the form of control logic in software or hardware or a combination of both. The control logic when executed by one or more processors is operable to perform the implementations described herein and other functions. For example, a tangible medium such as a hardware storage device can be used to store the control logic, which can include executable instructions.

Particular embodiments may be implemented by using a programmable general purpose digital computer, and/or by using application specific integrated circuits, programmable logic devices, field programmable gate arrays, optical, chemical, biological, quantum or nanoengineered systems, components and mechanisms. In general, the functions of particular embodiments can be achieved by any means as is known in the art. Distributed, networked systems, components, and/or circuits can be used. Communication, or transfer, of data may be wired, wireless, or by any other means.

A "processor" may include any suitable hardware and/or software system, mechanism, or component that processes data, signals or other information. A processor may include a system with a general-purpose central processing unit, multiple processing units, dedicated circuitry for achieving functionality, or other systems. Processing need not be limited to a geographic location, or have temporal limitations. For example, a processor may perform its functions in "real-time," "offline," in a "batch mode," etc. Portions of processing may be performed at different times and at different locations, by different (or the same) processing systems. A computer may be any processor in communication with a memory. The memory may be any suitable data storage, memory and/or non-transitory computer-readable storage medium, including electronic storage devices such as random-access memory (RAM), read-only memory (ROM), magnetic storage device (hard disk drive or the like), flash, optical storage device (CD, DVD or the like), magnetic or optical disk, or other tangible media suitable for storing instructions (e.g., program or software instructions) for execution by the processor. For example, a tangible medium such as a hardware storage device can be used to store the control logic, which can include executable instructions. The instructions can also be contained in, and provided as, an electronic signal, for example in the form of software as a service (SaaS) delivered from a server (e.g., a distributed system and/or a cloud computing system).

It will also be appreciated that one or more of the elements depicted in the drawings/figures can also be implemented in a more separated or integrated manner, or even removed or rendered as inoperable in certain cases, as is useful in accordance with a particular application. It is also within the spirit and scope to implement a program or code that can be stored in a machine-readable medium to permit a computer to perform any of the methods described above.

As used in the description herein and throughout the claims that follow, "a", "an", and "the" includes plural references unless the context clearly dictates otherwise. Also, as used in the description herein and throughout the claims that follow, the meaning of "in" includes "in" and "on" unless the context clearly dictates otherwise.

Thus, while particular embodiments have been described herein, latitudes of modification, various changes, and substitutions are intended in the foregoing disclosures, and it will be appreciated that in some instances some features of particular embodiments will be employed without a corresponding use of other features without departing from the scope and spirit as set forth. Therefore, many modifications may be made to adapt a particular situation or material to the essential scope and spirit.

What is claimed is:

1. A system comprising:
   one or more processors; and
   logic encoded in one or more non-transitory computer-readable storage media for execution by the one or more processors and when executed operable to cause the one or more processors to perform operations comprising:
   receiving a plurality of existing virtual points from a plurality of devices of a plurality of users;
   mapping out a common 3-dimensional (3D) virtual space based on views from the plurality of devices;
   displaying a live video of a scene on a device with a user interface overlay on top of the scene, wherein the scene corresponds to the 3D virtual space, and wherein the user interface overlay includes one or more objects and includes one or more selectable controls;
   enabling a user to enter one or more new virtual points by tapping on a target object on a display screen;
   receiving a selection of the one or more new virtual points on the target object, wherein the target object is one object of the one or more objects in an image;
   adding the selection of the one or more new virtual points to a 3D model, wherein the one or more new virtual points represent physical points on a target object;
   combining the one or more new virtual points with the plurality of existing virtual points received from the plurality of devices;
   generating 3D polygonal data based on a combination of the one or more new virtual points and the plurality of existing virtual points, wherein the one or more new virtual points becomes a part of the plurality of existing virtual points, wherein the 3D polygonal data is saved as a 3D model;
   receiving one or more additional new virtual points from one or more devices of the plurality of devices; and
   updating the 3D polygonal data based on a combination of the one or more additional new virtual points and the existing virtual points.

2. The system of claim 1, wherein the target object represents a physical target object in a physical environment, wherein the physical target object is represented as a live video image on the device with a data overlay, and wherein each new virtual point shown in the data overlay of the one or more new virtual points approximates a physical point on the physical target object.

3. The system of claim 1, wherein the one or more new virtual points are grouped as at least three new virtual points to form a polygon, and wherein the logic when executed is further operable to cause the one or more processors to perform operations comprising generating the 3D polygonal data based on the at least three new virtual points.

4. The system of claim 1, wherein the virtual points are vertices of a polygon.

5. The system of claim 1, wherein the logic when executed is further operable to cause the one or more processors to perform operations comprising:
   generating a polygon model based on the one or more new virtual points; and
   generating the 3D polygonal data in a specific 3D model format based on the polygon model.

6. A non-transitory computer-readable storage medium with program instructions stored thereon, the program instructions when executed by one or more processors are operable to cause the one or more processors to perform operations comprising:
   receiving a plurality of existing virtual points from a plurality of devices of a plurality of users;
   mapping out a common 3-dimensional (3D) virtual space based on views from the plurality of devices;
   displaying a live video of a scene on a device with a user interface overlay on top of the scene, wherein the scene corresponds to the 3D virtual space, and wherein the user interface overlay includes one or more objects and includes one or more selectable controls;
   enabling a user to enter one or more new virtual points by tapping on a target object on a display screen;

receiving a selection of the one or more new virtual points on the target object, wherein the target object is one object of the one or more objects in an image;

adding the selection of the one or more new virtual points to a 3D model, wherein the one or more new virtual points represent physical points on a target object;

combining the one or more new virtual points with the plurality of existing virtual points received from the plurality of devices;

generating the 3D polygonal data based on a combination of the one or more new virtual points and the plurality of existing virtual points, wherein the one or more new virtual points becomes a part of the plurality of existing virtual points, wherein the 3D polygonal data is saved as a 3D model;

receiving one or more additional new virtual points from one or more devices of the plurality of devices; and updating the 3D polygonal data based on a combination of the one or more additional new virtual points and the existing virtual points.

7. The computer-readable storage medium of claim 6, wherein the target object represents a physical target object in a physical environment, wherein the physical target object is represented as a live video image on the device with a data overlay, and wherein each new virtual point shown in the data overlay of the one or more new virtual points approximates a physical point on the physical target object.

8. The computer-readable storage medium of claim 6, wherein the one or more new virtual points grouped as at least three virtual points to form a polygon, and wherein the instructions when executed are further operable to cause the one or more processors to perform operations comprising generating the 3D polygonal data based on the at least three new virtual points.

9. The computer-readable storage medium of claim 6, wherein the virtual points are vertices of a polygon.

10. The computer-readable storage medium of claim 6, wherein the instructions when executed are further operable to cause the one or more processors to perform operations comprising:

generating a polygon model based on the one or more new virtual points; and generating the 3D polygonal data in a specific 3D model format based on the polygon model.

11. A computer-implemented method for 3D modeling using a client device, the method comprising:

receiving a plurality of existing virtual points from a plurality of devices of a plurality of users;

mapping out a common 3-dimensional (3D) virtual space based on views from the plurality of devices;

displaying a live video of a scene on a device with a user interface overlay on top of the scene, wherein the scene corresponds to the 3D virtual space, and wherein the user interface overlay includes one or more objects and includes one or more selectable controls;

enabling a user to enter one or more new virtual points by tapping on a target object on a display screen;

receiving a selection of the one or more new virtual points on the target object, wherein the target object is one object of the one or more objects in an image;

adding the selection of the one or more new virtual points to a 3D model, wherein the one or more new virtual points represent physical points on a target object;

combining the one or more new virtual points with the plurality of existing virtual points received from the plurality of devices;

generating the 3D polygonal data based on a combination of the one or more new virtual points and the plurality of existing virtual points, wherein the one or more new virtual points becomes a part of the plurality of existing virtual points, wherein the 3D polygonal data is saved as a 3D model;

receiving one or more additional new virtual points from one or more devices of the plurality of devices; and updating the 3D polygonal data based on a combination of the one or more additional new virtual points and the existing virtual points.

12. The method of claim 11, wherein the target object represents a physical target object in a physical environment, wherein the physical target object is represented as a live video image on the device with a data overlay, and wherein each new virtual point shown in the data overlay of the one or more new virtual points approximates a physical point on the physical target object.

13. The method of claim 11, wherein the one or more new virtual points grouped as at least three virtual points to form a polygon, and wherein the method further comprises generating the 3D polygonal data based on the at least three new virtual points.

14. The method of claim 11, wherein the virtual points are vertices of a polygon.

* * * * *